United States Patent
Ishii

(10) Patent No.: US 6,477,318 B2
(45) Date of Patent: *Nov. 5, 2002

(54) IMAGE RECORDING METHOD AND DEVICE IN WHICH COLOR CONVERSION INFORMATION IS RECORDED AS SUB-CODE INFORMATION, AND COMPUTER-READABLE RECORDING MEDIUM THEREFOR

(75) Inventor: Yoshiki Ishii, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,139

(22) Filed: Dec. 29, 1997

(65) Prior Publication Data

US 2002/0044756 A1 Apr. 18, 2002

(30) Foreign Application Priority Data

Dec. 27, 1996 (JP) .............................................. 8-350176

(51) Int. Cl.⁷ ................................................. H04N 5/91
(52) U.S. Cl. ........................ 386/95; 386/117; 348/232; 358/906

(58) Field of Search .......................... 386/95, 125, 102, 386/107, 117; 348/473, 476, 232, 207; 358/906, 909.1; 370/395; H04N 5/91

(56) References Cited

U.S. PATENT DOCUMENTS

| | | | | |
|---|---|---|---|---|
| 5,241,659 A | * | 8/1993 | Parulski et al. | 395/164 |
| 5,267,034 A | * | 11/1993 | Miyatake et al. | 358/105 |
| 5,335,072 A | * | 8/1994 | Tanaka et al. | 348/232 |
| 5,581,362 A | * | 12/1996 | Sakaue et al. | 386/95 |
| 5,682,458 A | * | 10/1997 | Funazaki | 386/128 |
| 5,684,919 A | * | 11/1997 | Kikuzawa et al. | 386/95 |
| 5,838,876 A | * | 11/1998 | Iwamura | 386/125 |
| 5,933,430 A | * | 8/1999 | Osakabe et al. | 370/395 |
| 6,075,920 A | * | 6/2000 | Kawamura et al. | 386/95 |

* cited by examiner

Primary Examiner—Vincent Boccio
(74) Attorney, Agent, or Firm—Fitzpatrick Cella Harper & Scinto

(57) ABSTRACT

With the object of effecting color management of dynamic image data obtained under a variety of image capture conditions, when dynamic image data is recorded on a medium by means of a recording head, together with the dynamic image data, conversion characteristic data for the purpose of converting the dynamic image data to another color space is recorded on the medium.

21 Claims, 16 Drawing Sheets

FIG. 7

| INPUT CHARACTERISTIC | COLOR SPACE CHARACTERISTIC INDEX |
|---|---|
| 1 | profile data #1 |
| ⋮ | |
| X | |
| X+1 | profile data #2 |
| ⋮ | |
| Y | |
| Y+1 | profile data #3 |
| ⋮ | |
| Z | |

FIG. 13
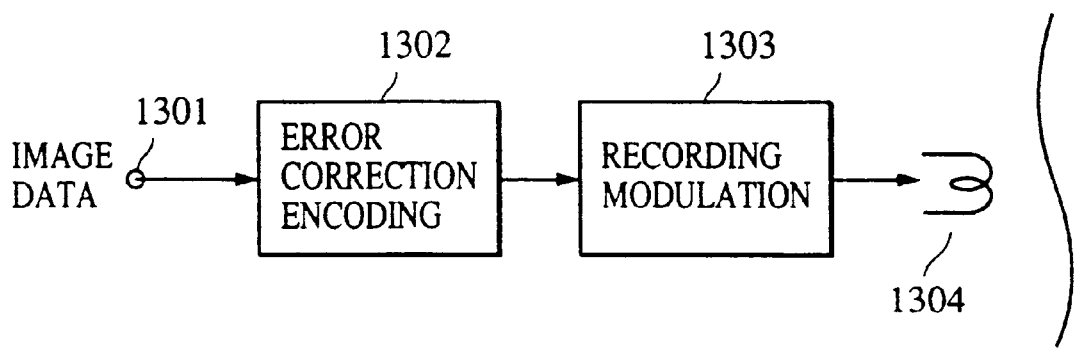
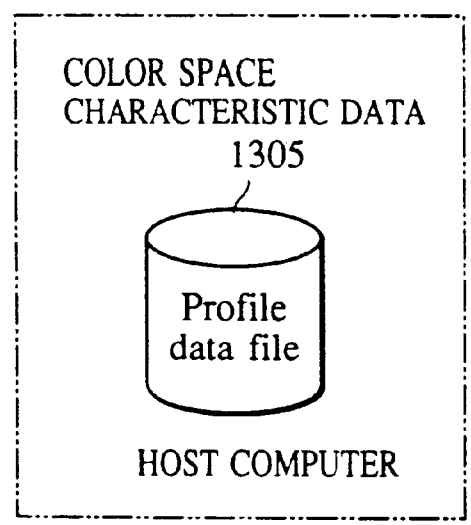

IMAGE RECORDING METHOD AND DEVICE IN WHICH COLOR CONVERSION INFORMATION IS RECORDED AS SUB-CODE INFORMATION, AND COMPUTER-READABLE RECORDING MEDIUM THEREFOR

BACKGROUND OF THE INVENTION

1. Field of the Invention

The present invention relates to an image recording device and method capable of optimum conversion processing of dynamic picture image data from an input device having variable characteristics, and to a computer-readable memory.

2. Description of the Related Art

With recent progress in digital encoding technology, methods for the digital recording of compressively encoded image data have become established, making it possible to record with high quality the images captured by a video camera or the like. In host-computer-based multimedia systems, on the other hand, there has been increasing research on color management systems (hereinafter referred to as CMS), for the purpose of adjusting the tint of image data between the input device and the output device. In color sync, which is representative of the CMS genre, it has been possible, by accomplishing conversion from device-dependent color space to independent color space, to realize a common CMS. For the purpose of this conversion, data representing a conversion characteristic of the independent color space (the Inter-Color Profile) for each device is provided within the host computer, so that the color space is converted by means of a conversion characteristic that is selected either automatically or manually at the time of conversion.

FIG. 13 is a drawing in which there is shown the relationship between image recording technology and the CMS according to prior art. Error correction encoding circuitry 1302 adds to the digital input data that has been input from pin 1301, parity data for the purpose of correcting data errors occurring in the recording medium. Processing, including modulation and the like for the purpose of recording on the recording medium, is applied in recording modulation circuitry 1303, and the data is recorded to the medium by recording head 1304.

The color space characteristic data for the CMS, on the other hand, has previously been fixedly provided as data file 1305 on the host computer, with the result that the characteristics of the recorded digital data are not reflected dynamically.

In a system according to prior art, direct connection to the host computer is accomplished as for a flatbed scanner, and for devices for which the characteristics of the input device itself do not change, the effectiveness of the CMS is realized by the use of conversion characteristic data that has been fixedly provided on a host computer.

In the case, however, when a CMS is to be implemented for devices the characteristics of which, when actually reading compressively encoded digital image data, cannot be identified, and specifically when it is desired to implement CMS using the signal of a video camera, recorder, etc., the color characteristics of which are greatly influenced by conditions of adjustment at the time of image capture, as the input data, using data recorded on a medium by a device recording digitally encoded data, no adequate effect can be realized using a conversion characteristic data provided on the host computer. A further problem is presented in that erroneous conversion will occur due to a characteristic not matched to the color adjustment condition at the time of image capture.

Further this assignee has applied in patent application No. 773896 of Dec. 27, 1996 for technology for carrying out color management processing for dynamic image data, but that application has not yet disclosed processing for the recording of dynamic image data on a recording medium.

SUMMARY OF THE INVENTION

Based on the above-recited facts, it is an object of the present invention to provide an image recording device that is capable of carrying out color management processing in the recording of dynamic image data to a medium.

To realize the above-described object, a device according to a preferred embodiment of the present invention is disclosed having a first recording means for recording dynamic image data on a medium, and a second recording means for recording on the medium, together with the dynamic image data, conversion characteristic data for converting the dynamic image data into another color space.

It is a further object of the present invention to provide a device that also carries out color management processing during playback of the dynamic image data.

It is a further object of the present invention to provide a computer-readable memory for carrying out on a computer the processing appropriate for the recording and playback of this dynamic image data.

The objects and characteristic features of the present invention will be clearly understood from the embodiments and drawings presented hereinbelow.

BRIEF DESCRIPTION OF THE DRAWINGS

FIG. 7 is a drawing in which there is shown an index table for outputting an index identical to a certain range of input characteristics.

FIG. 13 is a drawing in which there is shown the relationship between image recording technology and a CMS according to prior art.

DESCRIPTION OF THE PREFERRED EMBODIMENTS

Following is an explanation of the embodiments of the present invention with reference to the drawings.

Let it be noted that the digital image data to be processed in the embodiments of the present invention may equally be compressively encoded by means of discrete cosine transform (DCT) or the like.

Figure 1:
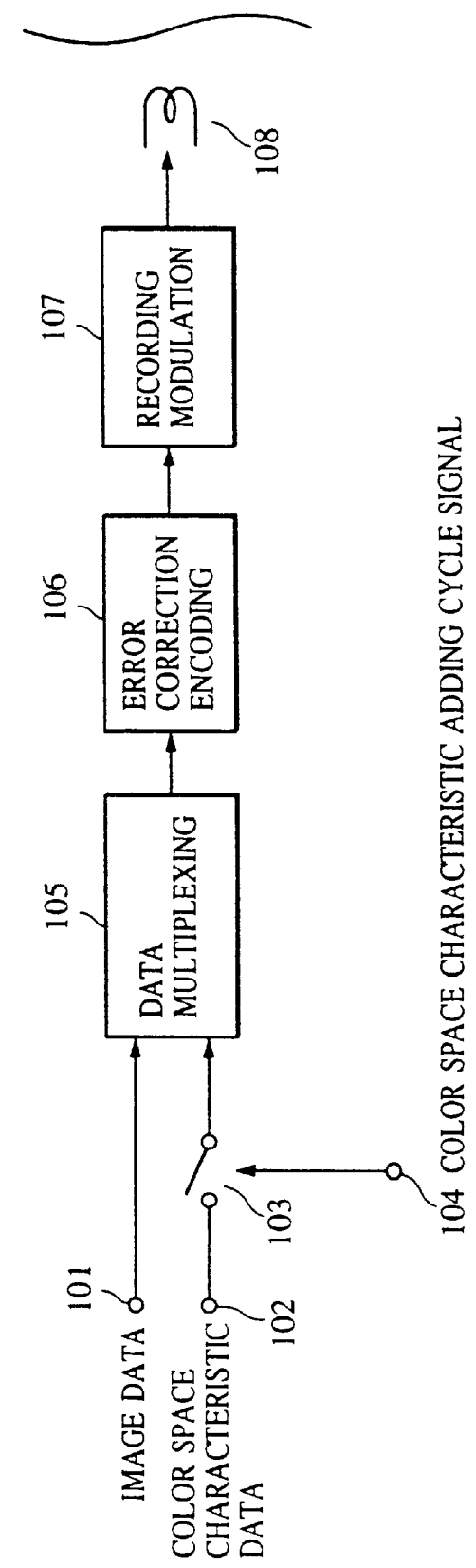
FIG. 1 is a block diagram of a digital image recording device according to a first embodiment of the present invention.
Figure 2:
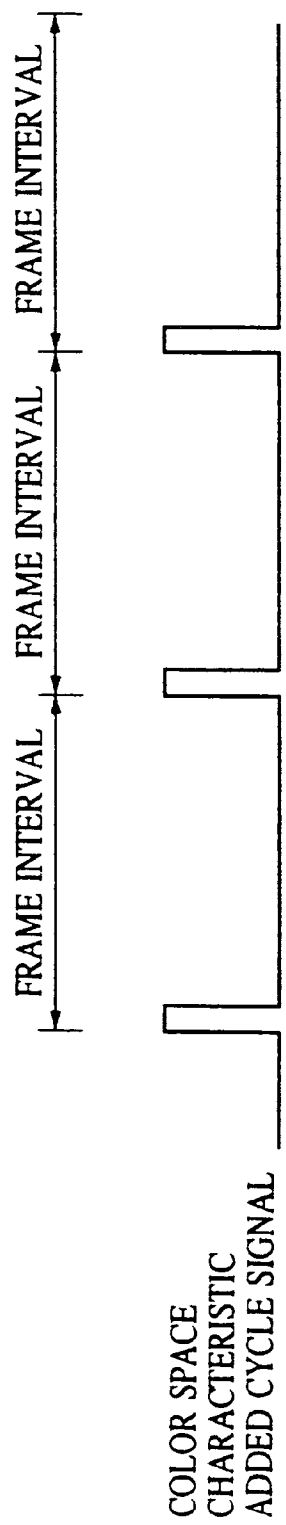
FIG. 2 is a drawing in which there is shown an adding cycle signal for the color space characteristic data.

FIG. 1 is a block diagram of a digital image recording device according to a first embodiment of the present invention. Digital image data obtained by capturing the image of a subject by photoelectric conversion is input to a pin 101, and color space characteristic data representing the color space characteristics of that digital image data is input to pin 102. As an example of color space characteristic data may be adduced profile data representing a conversion characteristic to a different color space, as in the standard known as the profile determined by the Inter-Color Consortium. Switching circuitry 103 supplies color space characteristic data from pin 102 to data multiplexing circuitry 105 at a given cycle added by means of a color space characteristic adding cycle signal applied to pin 104. FIG. 2 is a drawing in which there is shown an example of a color space characteristic adding cycle signal. In this example, the color space characteristic data is added to a dynamic image frame cycle.

The color space characteristic adding cycle signal need not, however, occur at every frame, as shown in FIG. 2. Provided there is variable frame transmission, it may equally occur at a given time interval, or every several frames. It may equally be at each change in image capture conditions. It is therefore possible, by recording color space characteristic data at given intervals, to track changes in color space characteristics during image capture in real time, and thereby make it possible to obtain correct color space characteristics even when a portion of the digital image data has been used.

Figure 3:
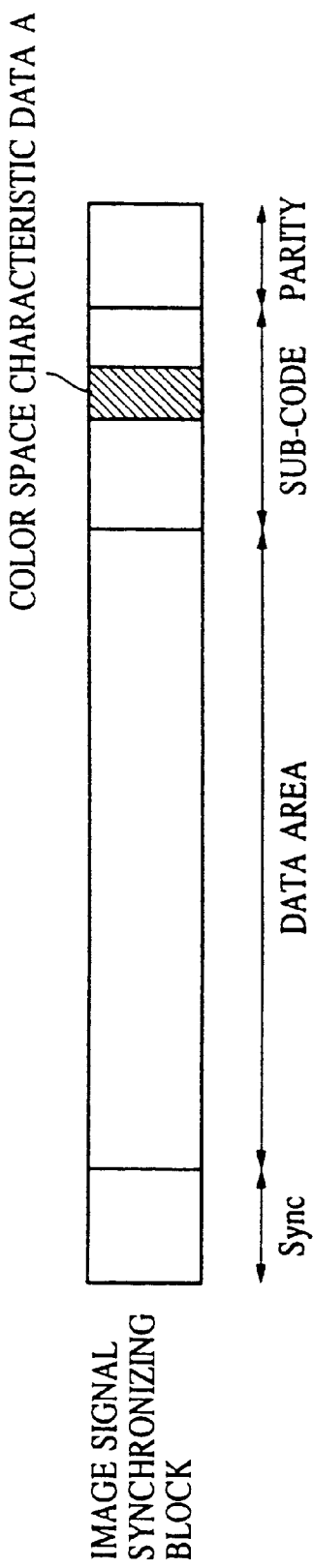
FIG. 3 is a drawing in which there is shown color space characteristic data multiplexed onto the sub-code area within the image data.

Data multiplexing circuitry 105 multiplexes color space characteristic data onto the format of this digital image data. In FIG. 3 there is shown an example of multiplexing in which color space characteristic data A is multiplexed onto the sub-code area of image data. The multiplexed data is subjected, at error correction encoding circuitry 106, to the adding of parity data for the purpose of correcting errors arising in the playback data due to defects etc. in the recording medium, and, at recording modulation circuitry 107, to modulation and other processing for the purpose of recording to the medium, and is recorded to the medium by recording head 108.

Figure 4:
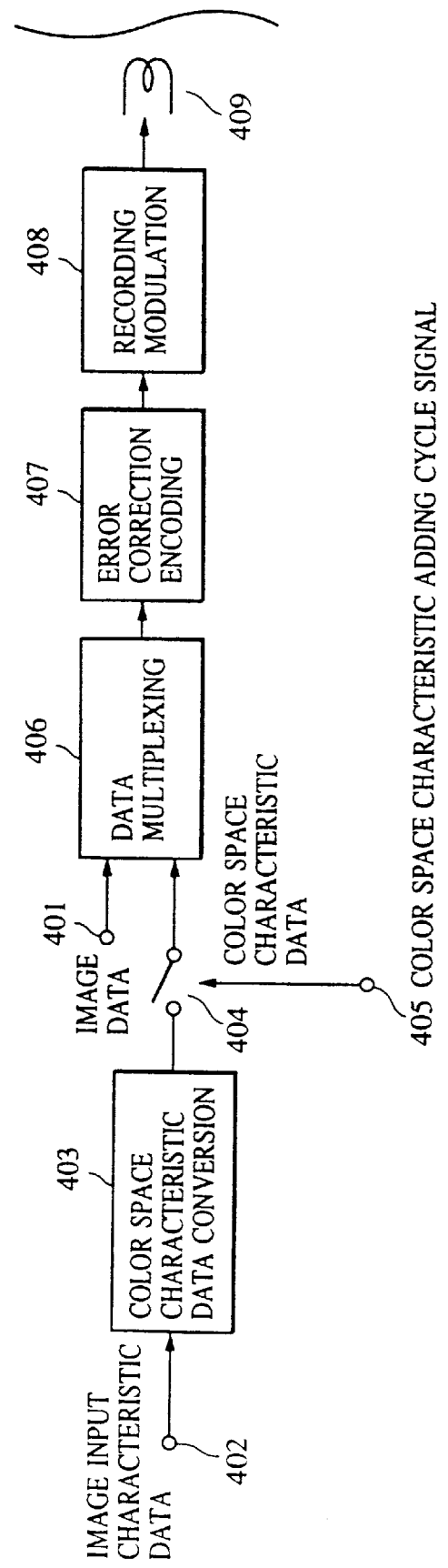
FIG. 4 is a drawing in which there is shown a second embodiment of the present invention, wherein color space characteristic data is selected and recorded by means of the input characteristics of the image data.

FIG. 4 is a drawing in which there is shown a second embodiment of the present invention, wherein color space characteristic data is selected by means of the input characteristics of the image data. Digital image data is input to pin 401, and the input characteristic for the digital image data is input to pin 402. As examples of image input characteristic data may be adduced adjustment information for an input device, such as the white balance, automatic exposure adjustment or gamma adjustment of a video camera, measurement information based on external measurements by a color measuring system, etc., image capture information set manually by the camera operator, and the like.

The image input characteristic data is then converted at color space characteristic data conversion circuitry 403 into the color space characteristic data previously described. Switching circuitry 404 supplies color space characteristic data from circuitry 403 to data multiplexing circuitry 406 at given intervals applied by a color space characteristic adding cycle signal supplied from pin 405, such as is shown, for example, in FIG. 2.

Data multiplexing circuitry 406 multiplexes the color space characteristic data by means of a sub-code area as shown, for example, in FIG. 3, onto the format of the digital image data. Error correction encoding circuitry 407 adds parity data to the multiplexed data for the purpose of correcting errors arising in the playback data due to defects etc. in the recording medium. The multiplexed data is subjected at recording modulation circuitry 408 to modulation and other processing for the purpose of recording to the medium, and is recorded to the medium by recording head 409.

Figure 5:
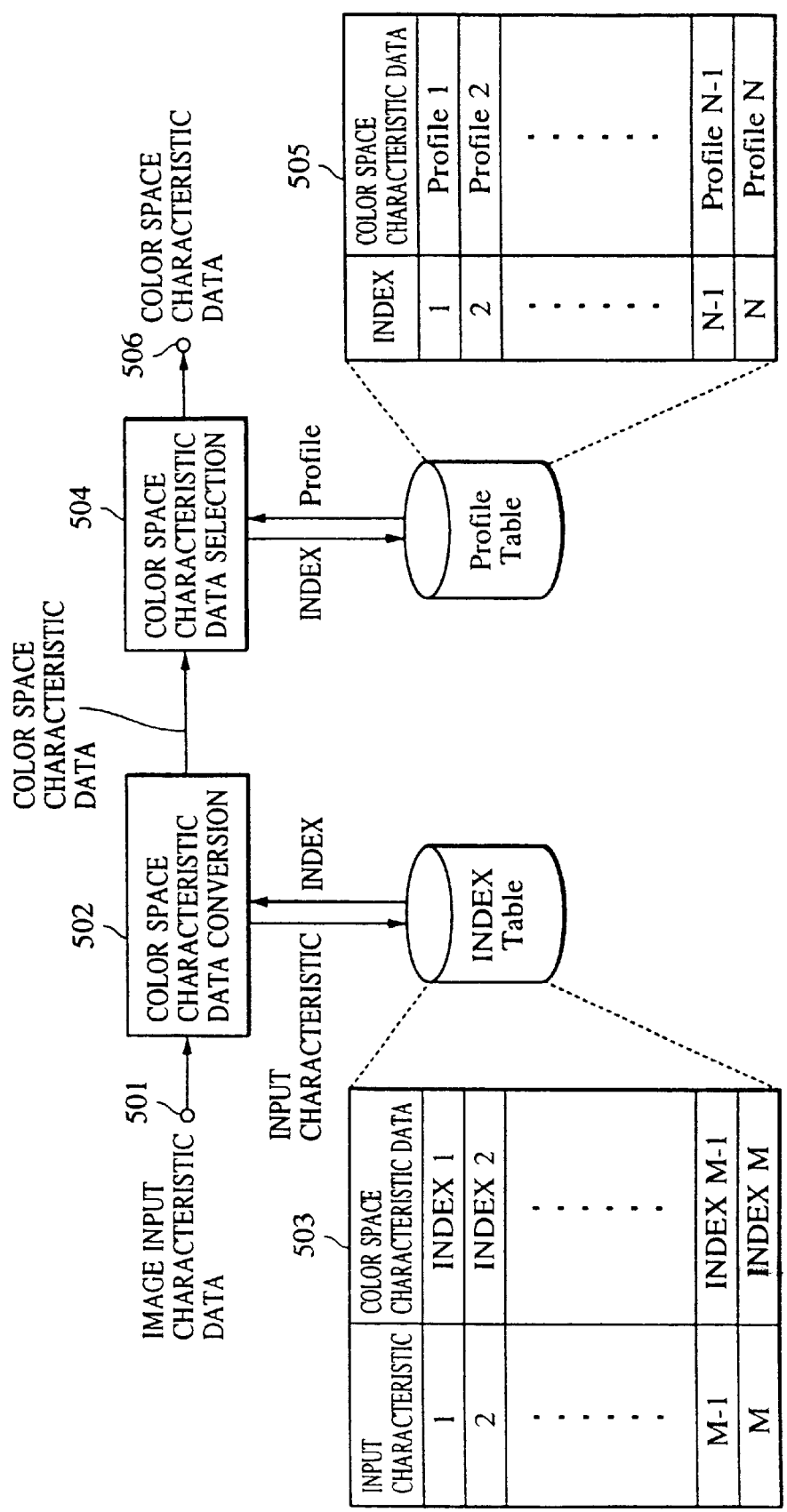
FIG. 5 is a drawing in which there is shown a conversion from image input characteristic data to color space characteristic data.

Conversion at color space characteristic data conversion circuitry 403 from white balance, automatic exposure adjustment, gamma adjustment or other image input characteristic data into color space characteristic data may equally be accomplished by means of a functional expression representing the characteristics of the input device, taking the image input compression data as a variable, and the color space characteristic data as the output. A further example, for the purpose of simplifying the structure of the circuitry, is shown in FIG. 5, in which image input characteristic data that is input from pin 501 is converted into color space characteristic data at color space characteristic data conversion circuitry 502. With respect to the values of image input characteristic data previously obtainable, this data is assigned a number corresponding to the previously measured color space characteristic data. In the present embodiment, conversion is accomplished by means of a table 503, but in an input system in which approximation can be realized by a simple threshold value process, it is equally possible to realize color space characteristic data conversion circuitry 502 by means of threshold value circuitry. In playing back the data from the recording medium, color space characteristic data selection circuitry 504 selects the previously measured color space characteristic data from table 505 in accordance with the data supplied from color space characteristic data conversion circuitry 502, and outputs it to pin 506.

Figure 6:
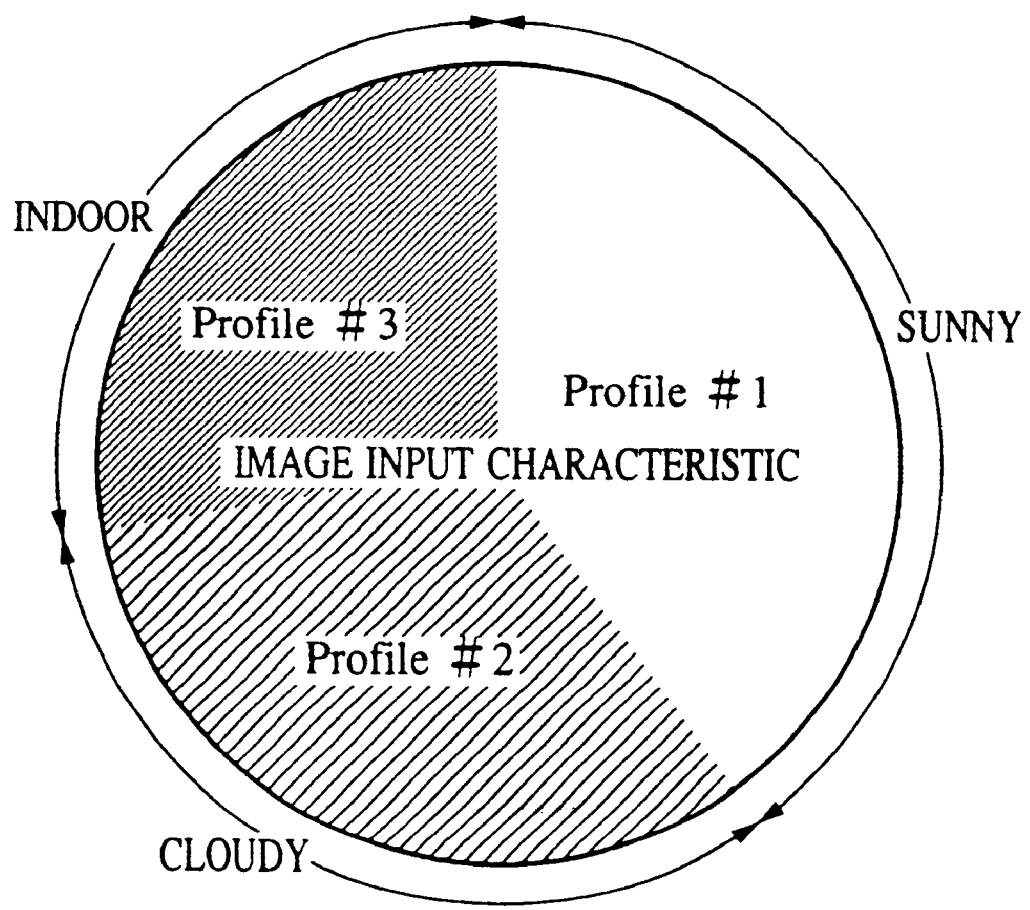
FIG. 6 is a drawing in which there is shown a conversion of a certain range of inputs into identical color space characteristic data.

It is not necessary that the number (range) M of image input characteristic data match the number N of color space characteristic data points, and by converting a certain range of inputs into identical color space characteristic data, it is also possible to. reduce the volume of data in the table. FIG. 6 is a drawing in which there is shown image input characteristics and the profile numbers established in correspondence with these input characteristics. In FIG. 6, the range of image input characteristics corresponding to clear weather are all converted to profile #1, the image input characteristics corresponding to cloudy weather are similarly all converted to Profile #2, and the image input characteristics corresponding to indoor conditions are all converted into Profile #3. It is thereby possible to calibrate characteristics for greatly differing image capture conditions using three types of color space characteristic data. This may be realized, as shown in FIG. 7, by outputting to index table 503 in FIG. 5 an index identical to a certain range of input characteristics, and by holding color space characteristic data corresponding thereto in profile table 505.

The present invention is not, however, limited to conversion of this range of color space characteristic data.

Figure 8:
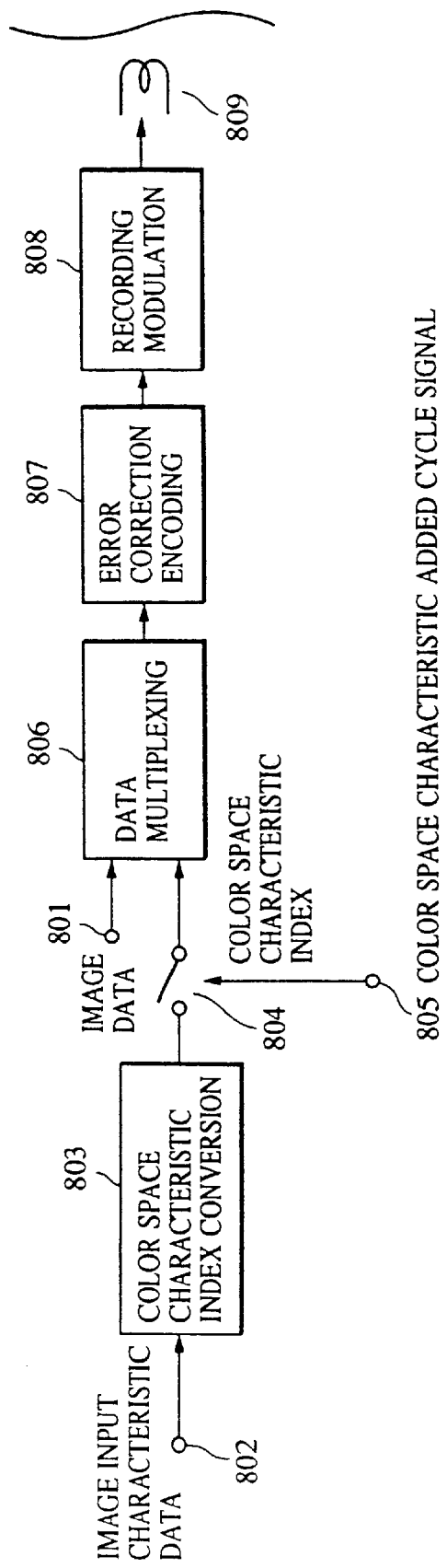
FIG. 8 is a drawing in which there is shown a third embodiment of the present invention, wherein the color space characteristic index is multiplexed onto the image data and recorded.

Following is an explanation of a third embodiment in which, as shown in FIG. 8, instead of the color space characteristic data itself, a color space characteristic index for the purpose of selecting the color space characteristic data is multiplexed onto the image data and recorded. In general, when the types of color space characteristic data are limited, it is possible, by recording index information for the purpose of selecting characteristic data instead of the data itself, to reduce the volume of data.

Digital image data is input to pin 801, and input characteristic data for that digital image data is input to pin 802.

The image input characteristic data is converted into this color space characteristic index at color space characteristic index conversion circuitry 803, and switching circuitry 804 supplies the color space characteristic index from conversion circuitry 803 to data multiplexing circuitry 806 in a given cycle applied by the color space characteristic adding cycle signal, as shown, for example, in FIG. 2.

Figure 12:
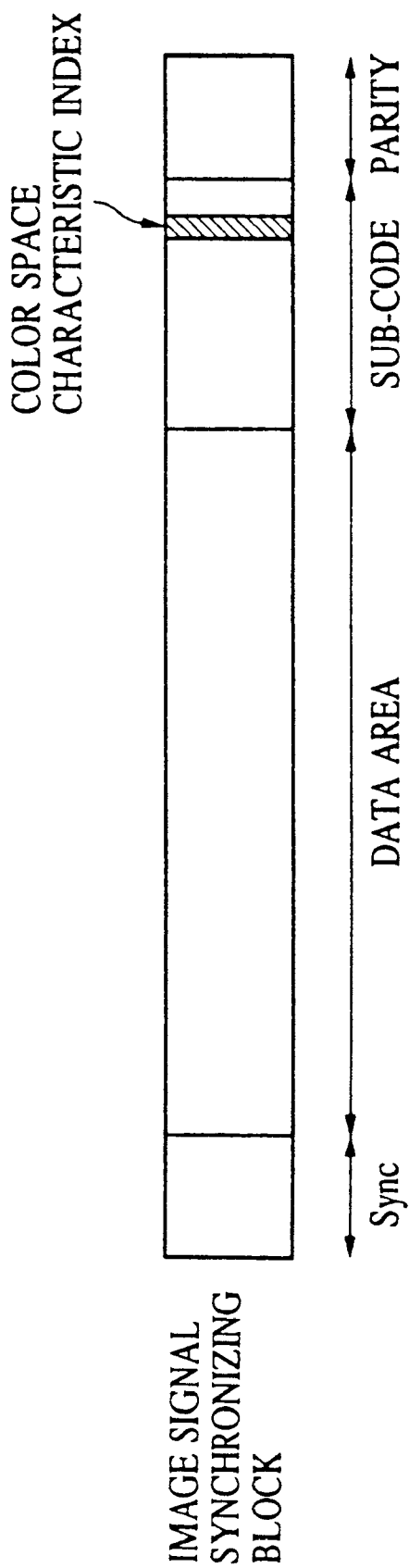
FIG. 12 is a drawing in which there is shown a color space characteristic index multiplexed onto the sub-code area within the image data.

Data multiplexing circuitry 806 multiplexes the color space characteristic index onto the format of the digital image data using, as shown, for example, in FIG. 12, a sub-code area that is separate from the data area. The multiplexed data is subjected, at error correction encoding circuitry 807, to the addition of parity data for the purpose of correcting errors arising in the playback data due to defects etc. in the recording medium, and, at recording modulation circuitry 808, to modulation and other processing for the purpose of recording to the medium, and is recorded to the medium by recording head 809.

Figure 9:
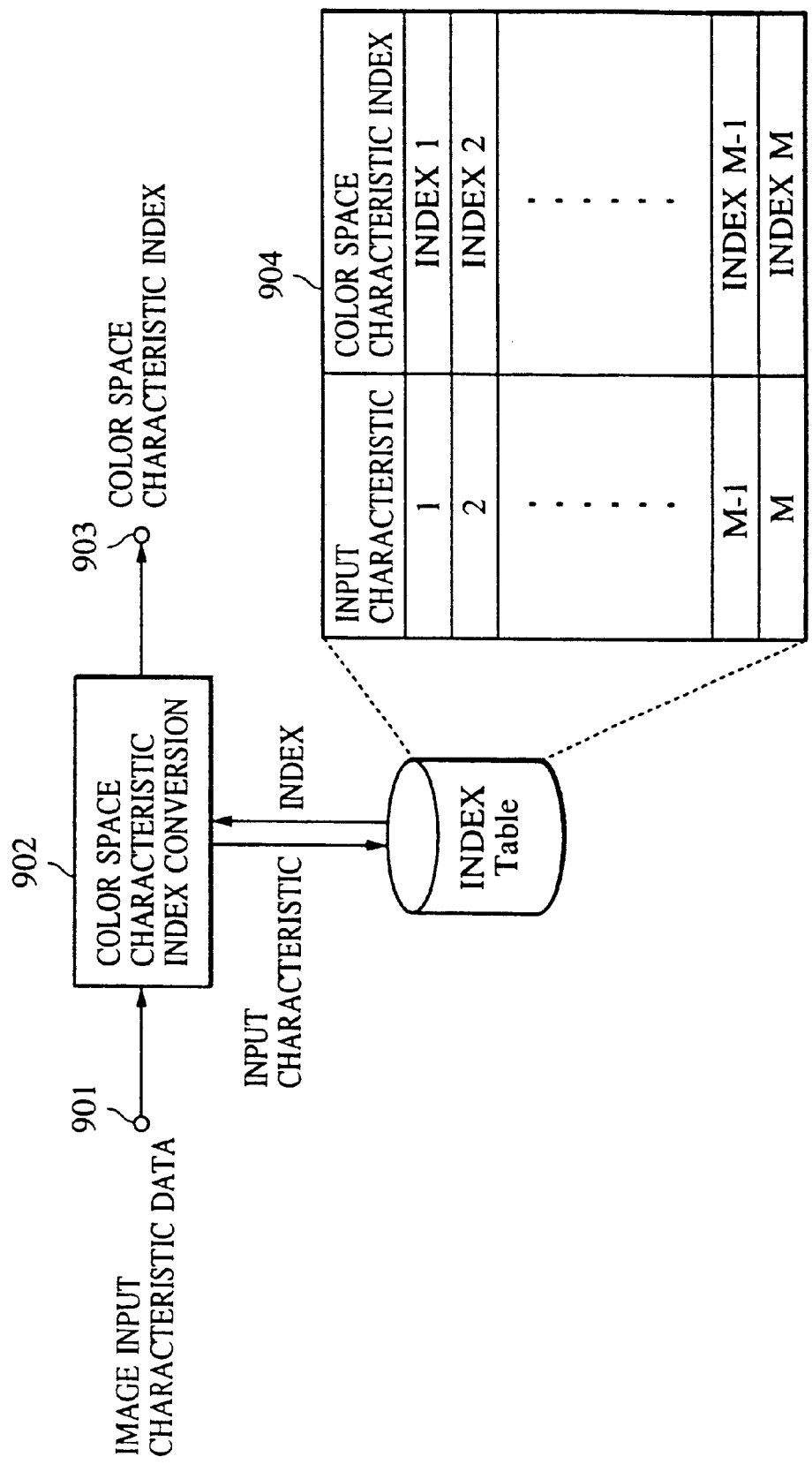
FIG. 9 is a drawing in which there is shown a conversion from image input characteristic data to a color space characteristic index.

And while it is possible for conversion from image input characteristic data to a color space characteristic index in index conversion circuitry 803 to be accomplished, as described above, by means of a map using a functional expression that represents the characteristics. of the input device, there is shown in FIG. 9 an example of color space characteristic index conversion circuitry in which, for simplicity, the index conversion circuitry uses a previously prepared table.

Image input characteristic data input from pin 901 is converted by color space characteristic index conversion circuitry 902 to an index for the purpose of selecting color space characteristic data, and is output to pin 903. This index is assigned numbers corresponding to color space characteristic data that was previously measured with respect to image input characteristic data. In this embodiment, conversion is accomplished using index table 904, relating to input characteristics. And in input systems that, without using a table, can perform approximation processing equivalent to an index table by means of comparison between a parameter representing input characteristics and a previously determined threshold value, color space characteristic index conversion circuitry 902 of the present invention may equally be realized by the use of threshold value circuitry.

Figure 10:
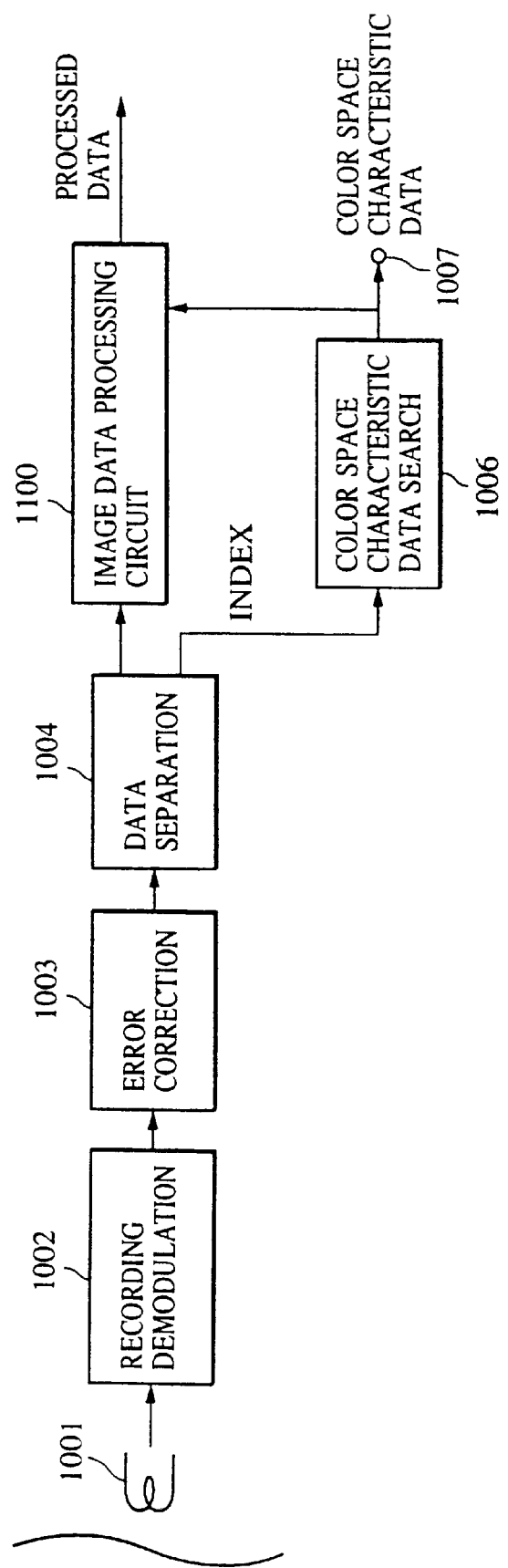
FIG. 10 is a drawing in which there is shown a typical circuit structure for playback of the multiplexed color space characteristic index.
Figure 11:
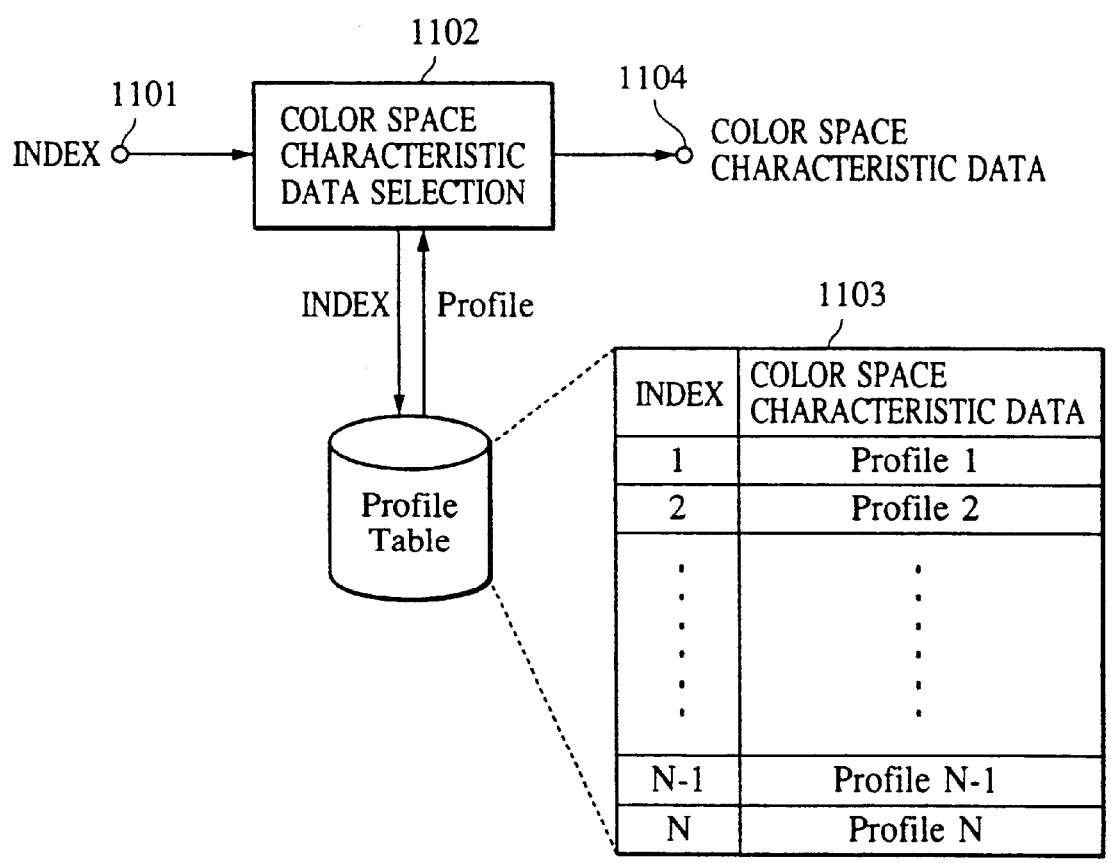
FIG. 11 is a drawing in which there is shown a conversion from a color space characteristic index to color space characteristic data.

In FIG. 10 there is shown an example of the structure of playback circuitry according to a third embodiment of the present invention. Recorded data to be played back by playback head 1001 is demodulated by recording demodulation circuitry 1002, and data error correction processing is accomplished by error correction circuitry 1003. In data separation circuitry 1004, the color space characteristic index, which was transmitted, for example, by means of the sub-code area of the image data, as shown in the example in FIG. 12, is separated, supplying the image data to image data processing circuit 1100 and the color space characteristic index to color space characteristic data selection circuitry 1006. Color space characteristic data selection circuitry 1006 retrieves the previously measured color space characteristic data from profile table 1103 as shown in FIG. 11, and outputs it to pin 1007.

Next, using this color space characteristic, color space characteristic data conversion processing is accomplished using image data processing circuitry 1100, for which color management processing is performed using matrix operations. Note that this color space characteristic data conversion processing may equally be accomplished using a table, or by using other operations.

Thus according to the present embodiment, as described above, it is possible to realize a digital image recording device which, when recording digital image data, records this digital image data together with color space characteristics for the purpose of the conversion thereof into other color space data, and thereby, during playback, can perform optimized color space characteristic data conversion using the recorded color space characteristics. Further, by recording the color space characteristic data at a given cycle with respect to dynamic image data, it becomes possible to track changes in color space characteristics in real time and to obtain correct color space characteristics even when a portion of the dynamic image data has been used.

Following, as an example of the multiplexing performed by data multiplexing circuitry 105 according to the present embodiment, is an explanation of a method of multiplexed transmission in which the transmission path conforms to a standard known as IEEE 1394. This method is realized by a serial bus (hereinafter referred to as a 1394 bus). Packets are formatted according to the isochronous transmission method and the asynchronous transmission method, which are the methods used for the 1394 bus. For image data, when the amount of data is large, the formatting of packets is accomplished on the basis of the isochronous transmission method; For color space characteristic data, which is transmitted in smaller volume and sporadically, the formatting of packets is accomplished on the basis of the synchronous transmission method.

Figure 15:
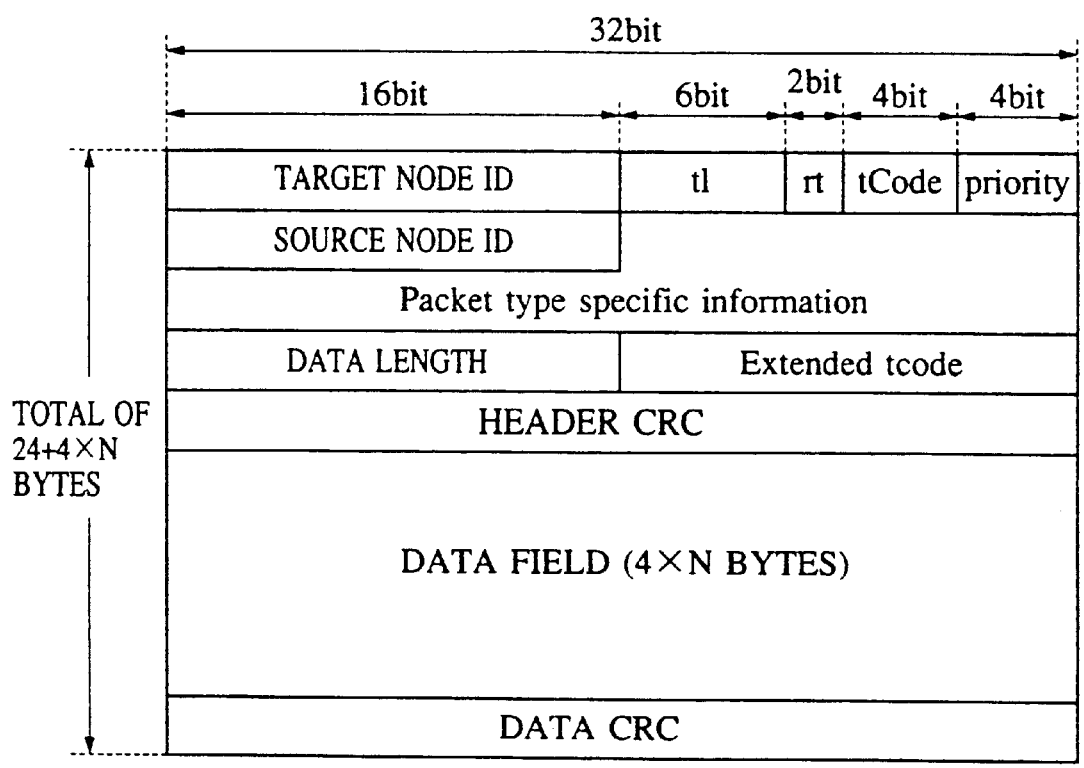
FIG. 15 shows the packet format for asynchronous transmission of multiplexing according to the present embodiment.
Figure 16:
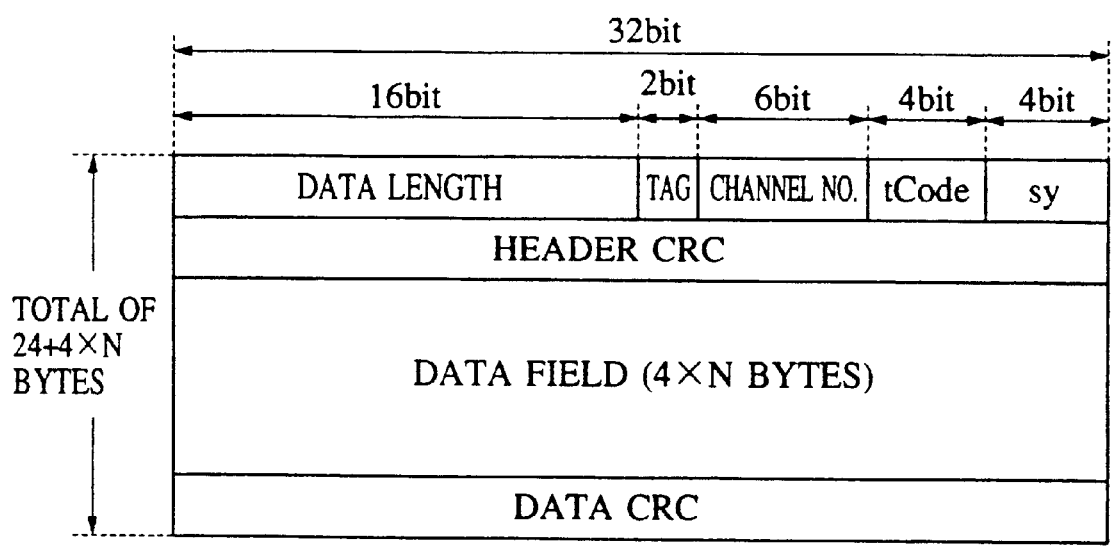
FIG. 16 shows the packet format for isochronous transmission of multiplexing according to the present embodiment.

The packet format for asynchronous transmission is shown in FIG. 15, and that for isochronous transmission in FIG. 16.

An asynchronous packet contains, in addition to the data field and the data CRC for error correction, a header portion. Transmission is accomplished by this header portion, in which are written, as shown in FIG. 15, the target node ID, source node ID, transmitted data length, various codes, etc.

Isochronous packets are sorted by the channel number assigned, and each type of packet contains, respectively, in addition to the data field and the data CRC for error correction, a header portion. Transmission is accomplished by this header portion, in which are written, as shown in FIG. 16, the transmitted data length, channel number, and various other codes, header CRC for error correction, etc.

Packet formatting circuitry 303 for image data creates a packet structure such as that shown in FIG. 16, while packet formatting circuitry for color space characteristic data 304 creates a structure such as that shown in FIG. 15.

Figure 14:
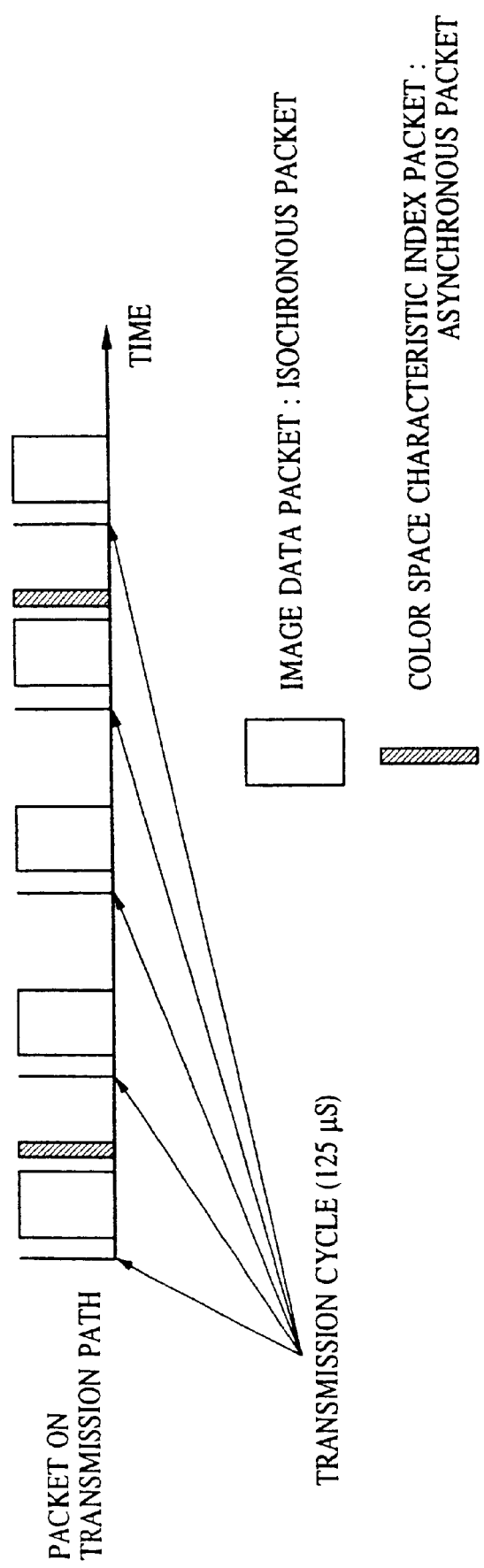
FIG. 14 is a drawing in which there is shown an example of multiplexing by data multiplexing circuitry 105.

To state this in a different way, image data packets are formatted into the data field shown in FIG. 16, while color space characteristic data packets are formatted into the data field shown in FIG. 15. FIG. 14 shows the timing chart for the transmission involved.

The significance of the fields shown in FIG. 15 is as follows:

Target node ID: Identification number of the other party to a transaction t1 (transaction label): A characteristic value enabling recognition that the transaction involves oneself and another party rt (retry): Information relating to the method of retrying when busy tCode: A transaction code specified by this packet Priority: (region to be used by the application layer) Source node ID: Identification number of the transmission source.

Packet-type specific information: Stores the rCode (value showing whether response succeeded or failed) <for request packets, shows the address outputting a read-out request>

Data length: Shows the length of the data field.

Extended tCode: (records addresses lower than the tCode)

Header/data CRC: CRC for error correction (in a request packet, the header CRC only)

Data field: The isochronous data to be transmitted (response packet only)

The significance of the fields shown in FIG. 16 is as follows:

Data length: Shows the length of the data field.

Tag: Designates the format to carry isochronous data Channel No.: Logical number assigned to transmission of packet data.

tcode: A transaction code for this packet (here indicates isochronous transmission)

sy: A value for handling synchronous information for exclusive use of the transaction layer Header CRC: CRC for error correction for the header (generated in the link layer)

Isochronous data: The isochronous data to be transmitted

Data CRC: CRC for-error correction for the data (generated in the link layer)

The way in which multiplexing is accomplished at this time is in accordance with the specifications for a 1394 bus, with superimposition of the given isochronous cycle effected in such a way that a packet transition condition such as is shown in FIG. 11 is produced.

Figure 17:
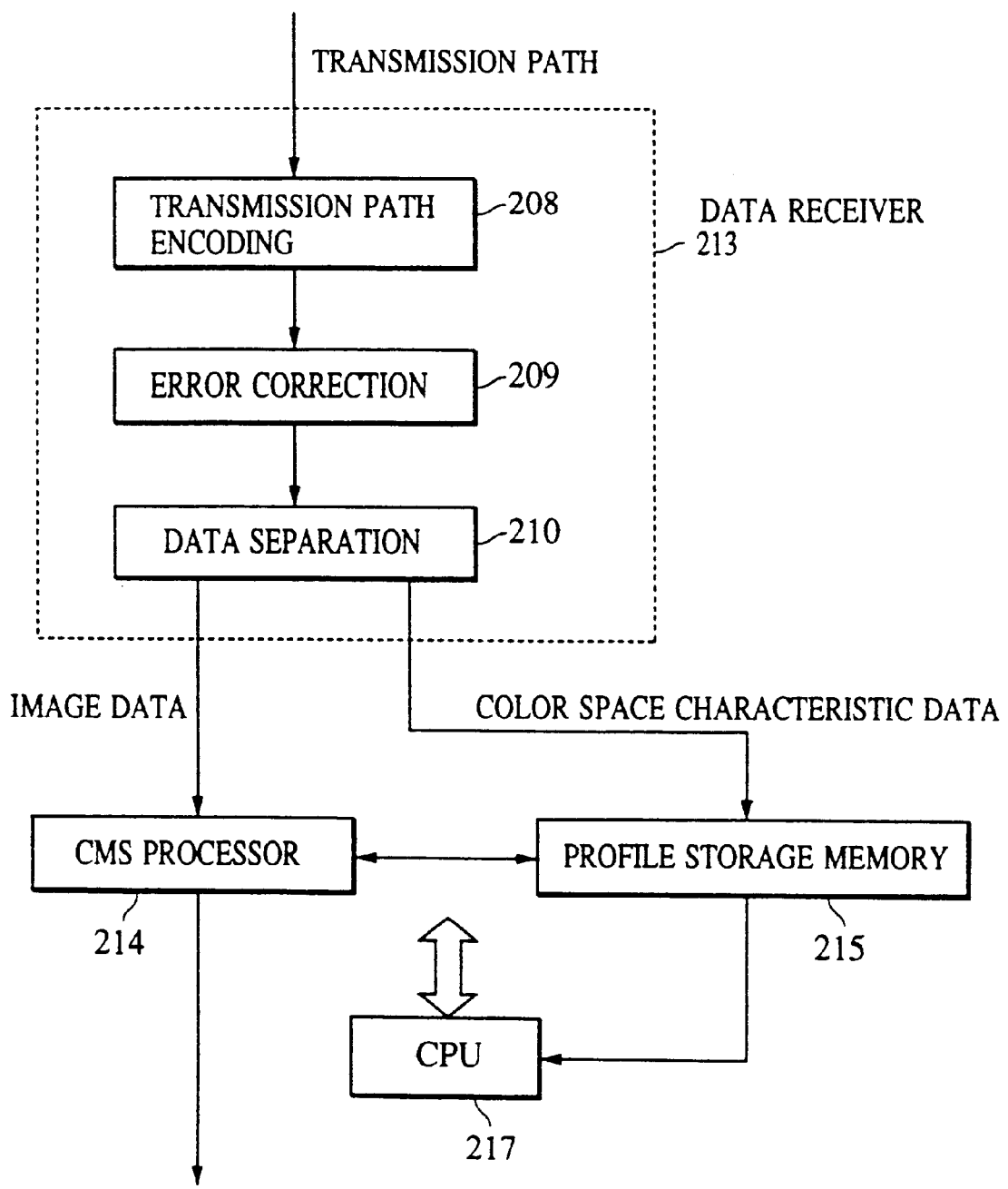
FIG. 17 is a block diagram in which there is shown the structure of CMS processing according to the present embodiment.

Following is an explanation of CMS processing of digital image data with reference to FIG. 17.

In the present embodiment, the CMS processing when color space characteristic data is multiplexed onto the sub-code area is shown in FIG. 17.

In the present embodiment, color space characteristic data is added as a sub-code to each block of data transmitted.

In this way, by means of a data receiver 213 including transmission path decoding circuitry 208, error correction circuitry 209 and data separation circuitry 210, digital image data is separated into the image data and color space characteristic data for one block.

The color space characteristic data is stored in profile storage memory 215 as a profile corresponding to the input image data. CMS processor 214, using the stored profile as the input profile, carries out input device-dependent CMS processing as well as output device-dependent CMS processing corresponding to the previously selected output device.

Since the image data that is of interest here is for a dynamic image, it is possible that, due to a scene change, etc., the color space characteristic data may change during the course of the image. Accordingly, CPU 217 judges whether the color space characteristic data that has been separated for each block is different from the color space characteristic data that was added to the previous block or not, and if it is different, stores that color space characteristic data in profile storage memory 215 as the input profile, and changes the input device CMS processing that is performed by processor 214 to CMS processing using that input profile.

In this way it is possible in accordance with the present embodiment to carry out real time CMS processing in response to changes in the color space characteristic occurring during the course of the dynamic image.

In the present embodiment it is possible to respond to scene changes by changing only the input device-dependent CMS processing on the basis of changes in the color space characteristic data added to each block.

It is equally possible to add the color space characteristic data not to every block, but only to those blocks for which the characteristics change.

Further, it is also possible for the profile in the embodiments above described to be data representing, for example, a 3×3 matrix or other transformation function, or a data table. It is also possible, obviously, for it to be in a format conforming to any desired standard, such as the Inter-Color Profile.

According to the present embodiment, it is possible to provide a color space conversion characteristic that is constantly suited to the image.

Further, according to the present embodiment it is possible to select a profile suited to the conditions of image capture.

Further, according to the present embodiment it is possible to obtain on playback of a dynamic image, an image in which the colors are matched.

It is also possible to accomplish the processing procedures of the present embodiment on a computer.

In such a case, the present invention includes the case in which a program representing the various processing procedures above described is first stored in a medium from which it can be read by a computer, the computer reads the program, and the computer performs the procedures of the present embodiment. The medium in such a case may be ROM, RAM, a computer-readable disk, etc.

In accordance with the present embodiment, since conversion characteristic data for the purpose of converting dynamic image data into another color space is recorded on a medium, it is possible, when the dynamic image data is later played back, to perform effective color space conversion processing.

What is claimed is:

1. An image recording device comprising:
   first recording means that records dynamic image data on a medium; and
   second recording means that records on the medium, together with the dynamic image data, a plurality of conversion characteristic data for converting the dynamic image data to another color space, wherein said second recording means adds the plurality of conversion characteristic data to the dynamic image data as conversion sub-code information, and records the conversion sub-code information in a sub-code area of the medium, wherein said plurality of conversion characteristic data correspond to an image input condition, wherein, by assigning a single color space conversion characteristic to a group made up of a plurality of input characteristics, there is provided, for a number M of input characteristics (where M is an integer such that M is not less than 1), a number N of conversion characteristic data (where N is an integer such that N is not greater than M, nor less than 1).

2. An image recording device according to claim 1, wherein said second recording means adds the plurality of conversion characteristic data to image data at given intervals of the dynamic image data to form the conversion sub-code information, and records the conversion sub-code information at the given intervals of the dynamic image data.

3. An image recording device according to claim 2, wherein the given interval is an interval of N frames.

4. An image recording device according to claim 1, wherein the dynamic image data and the plurality of conversion characteristic data are transmitted in accordance with an IEEE 1394 standard.

5. An image recording device according to claim 4, wherein the dynamic image data is transmitted by isochronous transmission in accordance with the IEEE 1394 standard.

6. An image recording device according to claim 4, wherein the plurality of conversion characteristic data is transmitted by asynchronous transmission in accordance with the IEEE 1394 standard.

7. An image recording device according to claim 1, wherein one or more of the plurality of conversion characteristic data is selected and recorded in accordance with information representing input characteristics of the dynamic image data.

8. A digital image recording device according to claim 1, wherein the dynamic image data is compressively encoded.

9. A digital image recording device according to claim 8, wherein the dynamic image data is compressively encoded by orthogonal transformation.

10. An image recording device according to claim 1, wherein the plurality of conversion characteristic data represents input characteristics of means for inputting the dynamic image data.

11. An image recording method comprising the steps of:
recording dynamic image data on a medium;
recording on the medium, together with the dynamic image data, a plurality of conversion characteristic data for converting the dynamic image data to another color space,
wherein the plurality of conversion characteristic data is added to the dynamic image data as conversion sub-code information, and the conversion sub-code information is recorded in a sub-code area of the medium, wherein said plurality of conversion characteristic data correspond to an image input condition, wherein, by assigning a single color space conversion characteristic to a group made up of a plurality of input characteristics, there is provided, for a number M of input characteristics (where M is an integer such that M is not less than 1), a number N of conversion characteristic data (where N is an integer such that N is not greater than M, nor less than 1).

12. An image recording method according to claim 11, wherein the plurality of conversion characteristic data is added to image data and recorded at given intervals of the dynamic image data to form the conversion sub-code information, and the conversion sub-code information is recorded at the given intervals of the dynamic image data.

13. An image recording method according to claim 12, wherein the given interval is an interval of N frames.

14. An image recording method according to claim 11, wherein the dynamic image data and the plurality of conversion characteristic data are transmitted in accordance with an IEEE 1394 standard.

15. An image recording method according to claim 14, wherein the dynamic image data is transmitted by isochronous transmission in accordance with the IEEE 1394 standard.

16. An image recording method according to claim 14, wherein the plurality of conversion characteristic data is transmitted by asynchronous transmission in accordance with the IEEE 1394 standard.

17. An image recording method according to claim 11, wherein one or more of the plurality of conversion characteristic data is selected and recorded in accordance with information representing input characteristics of the dynamic image data.

18. An image recording method according to claim 11, wherein the dynamic image data is compressively encoded.

19. An image recording method according to claim 18, wherein the dynamic image data is compressively encoded by orthogonal transformation.

20. An image recording method according to claim 11, wherein the plurality of conversion characteristic data represents input characteristics of means for inputting the dynamic image data.

21. A computer-readable medium storing a program for implementing an image recording method, the program comprising
code for a first step in which dynamic image data is recorded on a medium; and
code for a second step in which conversion characteristic data for converting the dynamic image data to another color space and the dynamic image data are recorded on the medium,
wherein the plurality of conversion characteristic data is added to the dynamic image data as conversion sub-code information, and the conversion sub-code information is recorded in a sub-code area of the medium, wherein said plurality of conversion characteristic data correspond to an image input condition, wherein, by assigning a single color space conversion characteristic to a group made up of a plurality of input characteristics, there is provided, for a number M of input characteristics (where M is an integer such that M is not less than 1), a number N of conversion characteristic data (where N is an integer such that N is not greater than M, nor less than 1).

* * * * *